Patented May 29, 1934

1,960,334

UNITED STATES PATENT OFFICE 1,960,334

PROCESS OF PREPARING N-METHYL COMPOUNDS OF THE PYRIDINE SERIES

Otto Ernst and Walter Berndt, Frankfort-on-the-Main, Germany, assignors to I. G. Farbenindustrie Aktiengesellschaft, Frankfort-on-the-Main, Germany No Drawing. Application March 31, 1930, Serial No. 440,620. In Germany April 19, 1929

8 Claims. (Cl. 260—42)

The present invention relates to the preparation of N-methyl compounds of the pyridine series.

We have found that N-methyl compounds of the pyridine series can easily be prepared with an excellent yield by causing methyl chloride to act upon the bases at ordinary or raised temperature. In this manner there can be obtained the chloro-methylates of pyridine

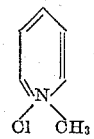

or the homologues thereof, such as, for instance, of the picolines, of the methoxypyridines, of benzopyridine (quinoline), of quinaldine and other substances containing the following ring system

The application of pressure has a favorable effect upon the velocity of the reaction. The pressure may be as high as desired. It is only limited by the strength of the apparatus used. When using technical bases it is suitable to select a temperature not too high, because more or less strongly colored impurities often appear. The process can, however, be applied at temperatures up to 200° C. When temperatures up to 150° C. are used this drawback does not occur. The formation of impurities can also be repressed by adding a diluent, such as water, ether, benzene, benzine, tetraline, decaline or the like to the base. In this case a temperature above 200° C. may be applied in order to accelerate the reaction. It is, however, useful not to apply temperatures higher than 200° C. By additions of catalytical action, particularly by addition of a chloride of copper or iron the velocity of the reaction is increased, but the formation of the disturbing impurities is promoted.

Most of the compounds obtainable are stable, and they are extremely hygroscopic salts. In the same manner as the corresponding iodine compounds they can be converted into other valuable compounds, for instance, into methylpyridones. A special advantage of the process lies in the use of the cheap methyl chloride instead of the formerly used expensive methyl iodide, while an equivalent effect is obtained.

The following examples illustrate the invention, but they are not intended to limit it thereto, the parts being by weight:—

1. Technically pure pyridine is saturated with methyl chloride gas and allowed to stand at a temperature of about 10° C.–20° C. After some time, the formation of crystals begins which, after several days' standing, permeate the whole solution. The yield depends upon the time of reaction. For instance after 12 hours the yield amounts to about 5 per cent.

2. Technically pure pyridine is heated in an atmosphere of methyl chloride to 90° C.–100° C. under ordinary pressure. Crystals of methyl-pyridine chloride are very soon formed in the liquid. If the methyl chloride gas is caused to circulate through the heated pyridine, the yield, for instance after 8 hours, amounts to about 55 per cent. Removal of the solid product from time to time produces a more rapid course of the reaction. The crystallized product is filtered by suction, washed with a suitable agent, such as ether, benzene, acetone or the like in order to remove the adhering pyridine, and dried in a current of dry air.

3. 200 parts of pyridine and 200 parts of benzene are together heated to 70° C.–80° C. in a bomb connected with a methyl chloride bottle and kept under a pressure of 4–5 atmospheres of methyl chloride. After 3 hours the yield of methylpyridine-chloride amounts to about 80 per cent. of the theory; after 5 hours the yield is nearly quantitative. By stirring the contents of the bomb the time of reaction can be diminished.

4. 460 parts of alpha-picoline are heated in a bomb to 50° C.–70° C. in the presence of 1 part of ferric chloride while applying a pressure of 10 atmospheres of methyl chloride. After about 250 parts of methyl chloride have been absorbed, the reaction ceases. The yield of methyl-alpha-picolinium chloride is nearly quantitative. A crystallized and hygroscopic product is obtained.

5. Gamma-picoline yields by application of the processes described in Examples 1–4, with the same good yield, the crystallized methyl-gamma-picolinium chloride.

6. Quinoline may be converted in the same manner as pyridine. By heating it in a bomb while applying a pressure of 10–20 atmospheres of methyl chloride, a reddish brown magma is obtained at 50° C.–60° C. from which crystals of methylquinolinium chloride are separated. The crude product can be purified by dissolving it in alcohol and boiling with decolorizing carbon. Colorless crystals of methylquinolinium chloride are then obtained.

7. 6 parts of alpha-alpha-chloro-picoline and 5 parts of benzene are heated together in an autoclave to 60° C.–90° C. under a pressure of 10 atmospheres of methyl chloride. After 5 hours the mixture is allowed to cool. The product N-methyl-alpha-alpha-chloro-picolinium chloride is separated from the layer of benzene and can be purified as indicated in Example 6. The unconverted part of the alpha-alpha-chloro-picoline, about 10–30 per cent. of the quantity used, remains dissolved in the benzene and may be used again in this solution for further batches.

8. 200 parts of pyridine and 200 parts of tetraline are stirred in an autoclave under a pressure of 7–10 atmospheres of methyl chloride and simultaneously heated to 190° C.–200° C. The product consisting of the chloro-methylate of the pyridine finally deposits in the form of a dark brown liquid layer and is separated in known manner from the upper layer which is a solution in tetraline of the unconverted part of the bases.

The layer containing the product is treated with a chemically or physically acting decolorizer, for instance with a small quantity of an oxidizing agent, or with decolorizing carbon after dilution with water, and can then be brought to crystallization by concentration. The product consists of N-methyl pyridinium chloride.

9. 300 parts of pyridine and 150 parts of water are heated together in an iron autoclave provided with stirrers for 5 hours to 70° C.–90° C. Methyl chloride under pressure is simultaneously introduced into the autoclave. The product is in aqueous solution. It is decolorized as described in Example 8 and evaporated in a vacuum until the crystallization is complete.

10. 50 parts of beta-methoxypyridine, 50 parts of benzene and 30 parts of methyl chloride are heated in a pressure vessel for 10 hours to 80° C.–120° C. When cooling, a mixture of N-methyl-beta-methoxypyridinium chloride and unaltered beta-methoxypyridine crystallizes from the reaction mixture. The separation of the reaction product from the starting material simply takes place by extraction with an organic solvent, for instance acetone, benzene or the like, whereat the beta-methoxypyridine dissolves but the N-methyl-beta-methoxypyridinium chloride remains undissolved.

We claim:

1. The process which comprises causing methyl chloride to act upon a substance of the following ring system

at a temperature between 10° C. and 200° C. under an elevated pressure up to about 20 atmospheres and in the presence of a chloride of a metal selected from the group consisting of copper and iron.

2. The process which comprises causing methyl chloride to act upon a substance of the following ring system

under a raised pressure up to about 20 atmospheres at a temperature between 10° C. and 200° C.

3. The process which comprises causing methyl chloride to act upon a substance of the following ring system

under a raised pressure up to about 20 atmospheres at a temperature between 10° C. and 200° C. by using a diluent.

4. The process which comprises causing methyl chloride to act upon a substance of the following ring system

under a raised pressure up to about 20 atmospheres at a temperature between 10° C. and 200° C. by using a diluent and in the presence of a chloride of a metal selected from the group consisting of copper and iron.

5. The process which comprises causing methyl chloride to act upon pyridine under a pressure of 4 to 5 atmospheres at a temperature between 70° C. and 80° C. by using benzene as a diluent.

6. The process which comprises causing methyl chloride to act upon compound of the following formula

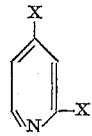

wherein one X stands for hydrogen and the other X stands for hydrogen or alkyl under an elevated pressure up to about 20 atmospheres at a temperature between 10° C. and 200° C.

7. The process which comprises causing methyl chloride to act upon α-picoline under an elevated pressure up to about 20 atmospheres at a temperature between about 10° C. and about 200° C.

8. The process which comprises causing methyl chloride to act upon α-picoline under an elevated pressure of about 10 atmospheres and at a temperature between about 50° C. and about 70° C.

OTTO ERNST.
WALTER BERNDT.